United States Patent [19]

Schoenmetz

[11] 4,151,506
[45] Apr. 24, 1979

[54] LOCK AND ALARM APPARATUS

[76] Inventor: Wilhelm Schoenmetz, 1160 Pauline Blvd., Ann Arbor, Mich. 48103

[21] Appl. No.: 724,517

[22] Filed: Sep. 20, 1976

[51] Int. Cl.$^2$ ............................................. B60R 25/10
[52] U.S. Cl. ................................. 340/63; 200/158; 307/10 AT; 340/542; 340/568
[58] Field of Search ................. 340/63, 65, 276, 275, 340/280, 134, 542, 541, 568, 571, 693; 200/158; 307/10 AT; 180/114

[56] References Cited
U.S. PATENT DOCUMENTS

| | | | |
|---|---|---|---|
| 880,668 | 3/1908 | Jones | 340/280 |
| 2,066,299 | 12/1936 | Mylius | 200/158 |
| 2,627,065 | 1/1953 | Poulson | 340/273 |
| 2,821,581 | 1/1958 | Parker et al. | 200/158 |
| 3,728,675 | 4/1973 | Horn et al. | 340/65 |
| 3,755,778 | 8/1973 | Kennedy | 340/63 |
| 3,781,861 | 12/1973 | Adler et al. | 340/63 |
| 3,803,576 | 4/1974 | Dobrzanski et al. | 340/276 |
| 3,824,540 | 7/1974 | Smith | 340/63 |

*Primary Examiner*—John W. Caldwell, Sr.
*Assistant Examiner*—James J. Groody
*Attorney, Agent, or Firm*—Olsen and Stephenson

[57] ABSTRACT

An alarm system for a cycle comprising an electrically conductive cable adapted at its ends to be secured to a housing assembly that is in turn mounted at a suitable location on the frame of the cycle. Control circuitry connects the cable to a warning device and is operable in response to detection of an electrically conductive contact with the cable to activate the warning device for a preset length of time. The housing assembly includes a hollow casing body and a closure plate that is secured to the casing body by screw members which are connected to the control circuitry and which function as switches. In response to a removal of any one of the screw members a predetermined distance the control circuitry activates the warning device.

6 Claims, 7 Drawing Figures

U.S. Patent    Apr. 24, 1979    Sheet 1 of 2    4,151,506
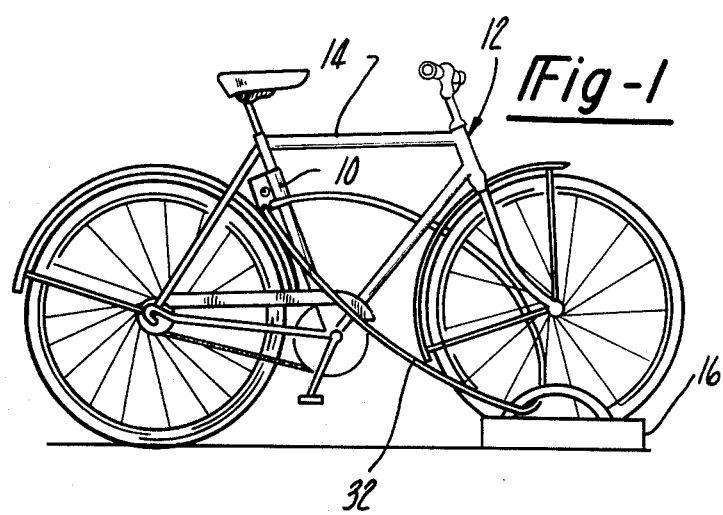
Fig-1
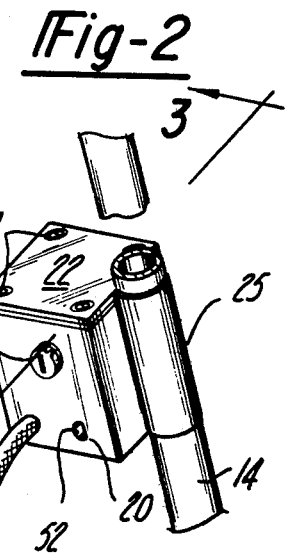
Fig-2
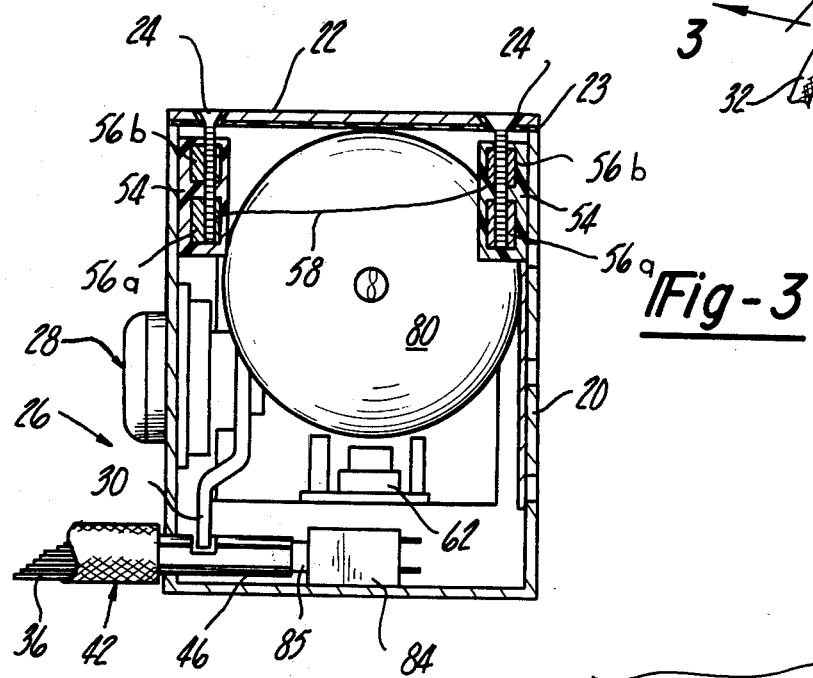
Fig-3
Fig-4

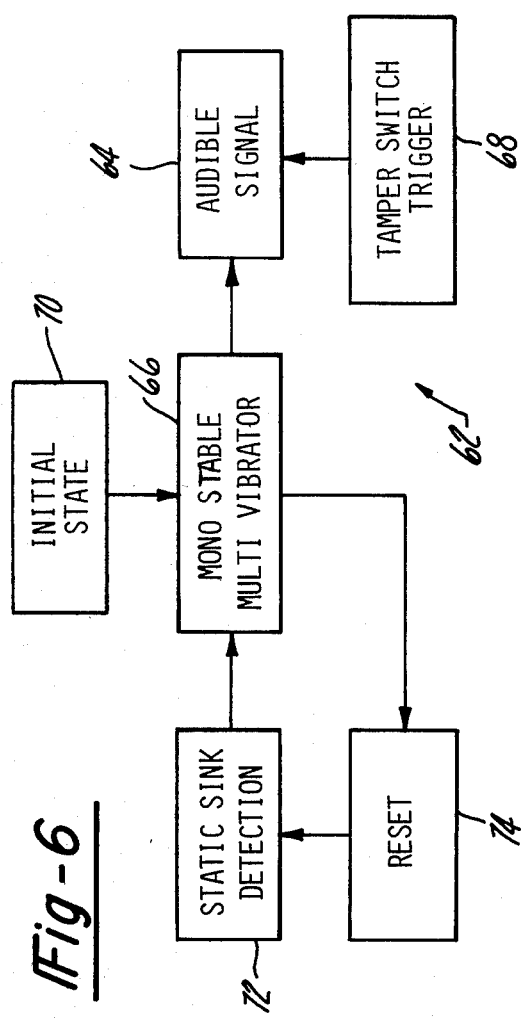
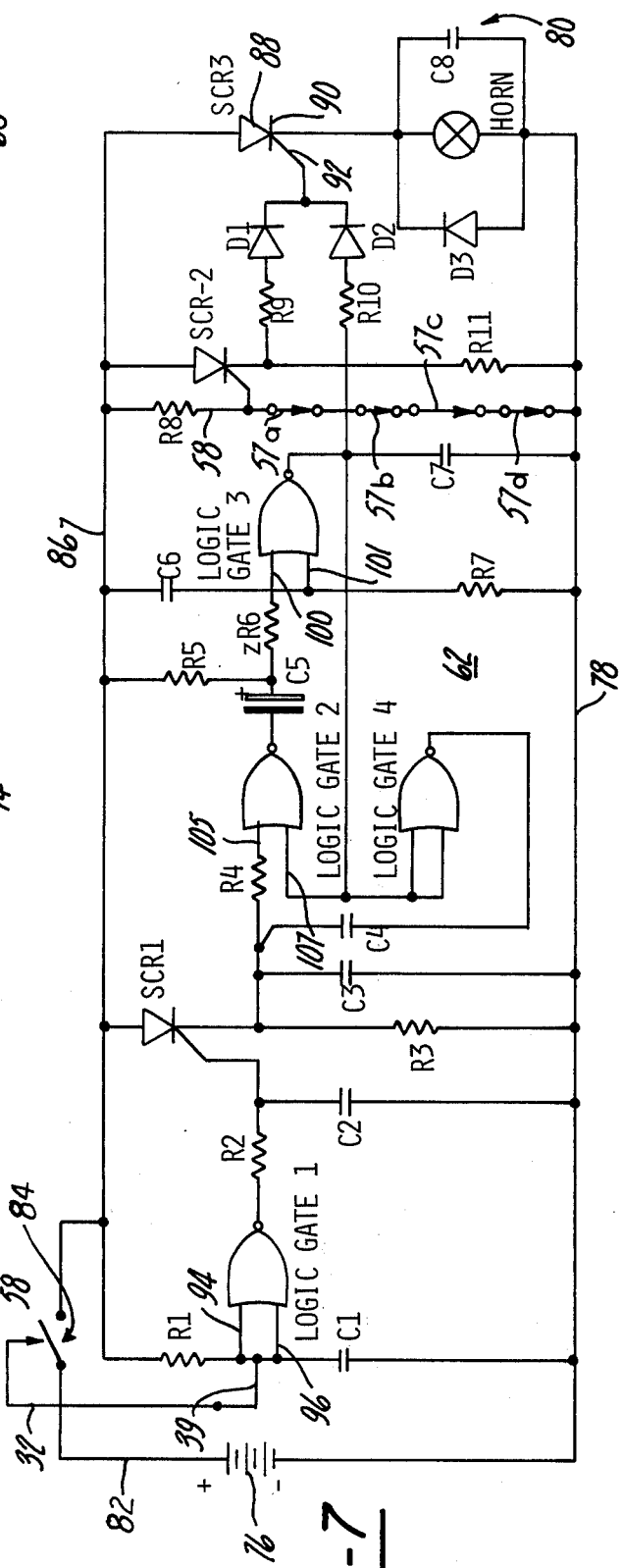

LOCK AND ALARM APPARATUS

BACKGROUND OF THE INVENTION

The present invention relates generally to alarm systems, and more specifically, to an alarm system used in conjunction with apparatus for anchoring objects at predetermined locations. In particular, the present invention is disclosed as being operational in connection with apparatus for anchoring a cycle to a cycle rack, other relatively fixed objects, or to other cycles.

Reference is made to U.S. Pat. No. 3,755,778, issued on Aug. 28, 1973 to Kennedy et al. which discloses an alarm system for a cycle. An unauthorized movement of the cycle or contact with a metallic sheath that covers the cable will activate the alarm. The alarm will continue to sound until the alarm circuit is opened by a key-operated switch that is generally in the possession of the user of the cycle. Thus, it is quite possible that the battery may be completely discharged before the user can deactivate the system. If the system becomes inoperative because of a discharged battery, the cycle is vulnerable to a future theft attempt.

The present invention is distinctive over this patent by providing an alarm system in which the alarm, upon activation, continues to sound for a preset length of time. The warning signal is automatically terminated and the alarm system is then automatically reset, ready to be activated upon detection of subsequent theft attempts. The present invention further provides for sounding the alarm if anyone tampers with the housing in which the circuitry of the system is located.

SUMMARY OF THE INVENTION

A housing assembly, having a metallic cable connected thereto, an audible warning device, a battery and control circuitry is mounted securely on the frame of a cycle. The cable has one end permanently affixed to the housing and the other free end adapted to be releasably engaged with a lock mechanism in the housing. Upon engagement of the free end of the cable with the lock mechanism a switch is depressed activating the alarm system. The cable itself is electrically connected to the control circuitry and if conductive contact is made with the cable, such as with cable cutters, the control circuitry will activate the alarm for a preset length of time. After the warning device has developed a sound signal for the preset length of time, the control circuitry will deactivate the warning device and reset the alarm system. An initial blast of the warning signal should ward off the burglar. If he persists, the alarm system will again be reactivated for the preset length of time in response to further detection of electrically conductive contact with the cable. In this manner, the alarm system is effective to foil theft attempts while the reset feature provides an extended battery life.

The invention further provides for activation of the warning device when the housing is tampered with. Screw members secure a closure plate over an access opening in the housing. The screw members and the mountings in which they are secured form normally closed switches in the control circuitry that are insulated from the housing assembly. When any one of the screw members is removed a predetermined distance the circuitry activates the warning device. In order to terminate the warning signal caused by such tampering, the user having the key must remove the free end of the cable from the lock mechanism.

It is thus the primary object of this invention to provide an audible alarm system for deterring unauthorized use or removal of the cycle.

Another object of the invention is to provide an alarm system which automatically terminates operation of the alarm device and resets itself after operating for a preset length of time.

Still another object of this invention is to provide an alarm system that is activated when the housing that encloses the alarm components is tampered with.

Further objects, features and advantages of the present invention will become apparent from a consideration of the following description when taken in connection with the appended claims and the accompanying drawings in which:

FIG. 1 is an elevational view of the alarm system of the present invention securing a cycle to its cycle rack;

FIG. 2 is a perspective view of the housing assembly of the present invention shown attached to the frame of a cycle;

FIG. 3 is a sectional view of the alarm apparatus taken substantially from line 3—3 in FIG. 2;

FIG. 4 is an elevation view with certain parts cut away showing the cable secured to the housing;

FIG. 5 is a sectional view of a portion of the housing showing a fastening arrangement for securing a closure to the housing;

FIG. 6 is a schematic diagram of the circuitry of the present invention; and

FIG. 7 is a schematic diagram similar to FIG. 6 but showing in greater detail the components of the circuitry of the present invention.

Referring to the drawing, the alarm system, indicated generally at 10 in FIG. 1, is shown secured to a cycle 12 having a frame 14 and being anchored to a bicycle rack 16.

The alarm system 10 includes a housing assembly 18, FIG. 2, which is comprised of a hollow casing body 20 and a closure plate 22 that overlies an access opening to the interior of the hollow casing body 20. A gasket 23 formed of dielectric material, FIG. 3, is disposed between the closure plate 22 and the casing body 20 to provide an insulated seal between the closure plate 22 and the casing 20. Screw members 24 extend downwardly through the closure plate 22 and into the casing 20 to secure the closure plate 22 to the casing body 20. A sleeve-like clamp 25 is integrally formed with the casing body 20 and functions to mount the housing assembly 18 to the frame 14 of the cycle 12.

An anchoring assembly 26 for anchoring the cycle 12 to the rack 16 includes a key operated lock mechanism 28 that is secured to the casing body 20 of the housing assembly 18. The lock mechanism 28 includes a swingable restraining arm 30 that is movable between lock and unlocked positions by a key (not shown). The anchoring assembly 26 further includes a connector element such as the cable 32 which is formed of flexible metallic material 36 that is surrounded by a sheath 34 formed of dielectric insulating material. The metallic material extends substantially over the length of the cable 32 which has one end portion 38 securely attached to the body 20 by being imbedded in binding material such as the epoxy 40, for example. The metal 36 of the cable 32 is connected by a conductor 39 to the circuitry for activating the warning device when electrically conductive contact is made with the metal 36. The other free end 42 of the cable 32 has a sleeve portion 44 from which a shaft 46 extends. The shaft 46 is operable to engage with the lock mechanism 28 in the housing 18 and is formed having a transverse slot 48 and a flat surface 50. The arm 30 of the lock mechanism 28 is positioned in the slot 48, FIG. 3, when the shaft 46 is positioned in an opening 52 in the body 20. The opening 52 is formed to a configuration similar to the configuration of the shaft 46 so that the slot 48 is properly oriented relative to the arm 30 of the lock mechanism 28 to provide for locking engagement between the two components when the shaft 46 is disposed in the opening 52.

The closure plate 22 is secured to the casing body 20 by four screw members 24. Threaded mountings 54 formed of suitable dielectric material and having spaced apart metallic elements 56a and 56b are integrally formed at the interior of the casing 20. The screw members 24 are threadably mounted into corresponding mountings 54 to secure the closure plate 22 in place. An insulating shoulder gasket 60 is provided to insulate each screw member 24 from electrical contact with the housing 20. As can be seen in FIG. 5, when one of the screw members 24 is coupled to the mounting 54, an electrically conductive path extends from metallic element 56a through the screw member 24 and to the other metallic element 56b. Thus, a circuit is formed when the conductor 58 is connected to the metallic elements 56a and 56b. When the screw member 24 is removed a predetermined distance sufficient to break contact with the lower element 56a, the circuit is open. In this manner, each screw member 24 and its corresponding mounting 54 functions as a switch device 57. Conductor 58 serially connects the elements 56a and 56b of each mounting 54 that when anyone of the screw members 24 is partially removed the circuit will be opened to activate the warning device 64.

A block diagram of the control circuitry 62 is shown in FIG. 6. The audible signal 64 is activated in one of two manners. A monostable multivibrator 66, which itself has been triggered by an external pulse, develops a pulse that is applied for a preset length of time to the audible signal 64 causing it to be activated for that period of time. A tamper switch trigger 68 is activated when one of the screw members 24 is removed a predetermined distance opening the switch 57 which activates the alarm 64 until the alarm system is manually switched off. An Initial State circuit 70 functions to establish the electronic stability of the system when it is activated by momentarily precluding the multivibrator 66 from developing any output to the Audible Signal 64. A Static Sink Detection Circuit 72 is operational to detect when an electrically conductive contact is made with the cable 32, and in response to such detection it develops a pulse that is applied to the multivibrator 66 which in turn activates the audible signal 64 for the preset length of time. This signal is also applied to a Reset Circuit 74 to reset the Static Sink Detection Circuit 72. After this period of time has lapsed, the multivibrator 66 develops a signal which terminates operation of the audible signal 64. The Reset Circuit 74 functions to return the Static Sink Detector circuit 72 to a state ready to develop another output signal in response to detection of an electrically conductive contact.

Referring to FIG. 7, the circuitry 62 of the present invention will be explained in greater detail. A battery 76 is provided having its negative terminal connected by conductor 78 to one terminal of a warning device such as the horn 80. The positive terminal of the battery 76 is connected to the other terminal of the horn 80 through conductor 82, switch 84 and the conductor 86.

The switch 84, FIG. 3, is a normally opened push type that is closed, when the shaft 46 is inserted into the opening 52 to engage its actuator 85. A semiconductor controlled rectifier, SCR3, is connected in series with the positive pole of the battery 76 and the other terminal of the horn 80. The SCR3 has an anode 88, a cathode 90 and a gating electrode 92. Conduction of energy to the horn is prevented until a predetermined voltage is applied to the gate 92 to activate the SCR3 to permit anode-cathode conduction. The diode D3 and the capacitor C8 are each connected in parallel across the terminals of the horn 80 and are used to filter voltage spikes created by inductance charging and discharging of the horn coil.

The Static Sink Detection circuitry 72 comprises the Logic Gate 1 which is a conventional NOR gate. The inputs 94 and 96 to Logic Gate 1 are connected through resistor R1 to the conductor 86, which is in turn connected to the positive terminal of the battery 76 through conductor 82 and the switch 84. The inputs 94 and 96 are also connected through capacitor C1 to the negative terminal of the battery 76 through conductor 78 and to the cable 32 through the conductor 39. When the alarm system 10 is activated, the potential at the inputs 94 and 96 will be held high through resistor R1. Capacitor C1 functions to filter noise and assure stability in the system. The output of Logic Gate 1 is transmitted through resistor R2 to the gating electrode of a semiconductor controlled rectifier, SCR1. SCR1 has its anode connected to conductor 86 and its cathode connected through resistor R3 to the conductor 78. The cathode of SCR1 is also connected to the monostable multivibrator 66 through the resistor R4. The capacitor C2, which is connected between the resistor R2 and the conductor 78 function to filter noise.

The monostable multivibrator 66 comprises a Logic Gate 2 having inputs 105 and 107 is a conventional NOR gate, the output of which is applied to the negative terminal of a capacitor C5. The positive terminal of the capacitor C5 is connected through resistor R5 to the conductor 86 and is also connected through resistor R6 to the input 100 of a Logic Gate 3, also a conventional NOR gate. The other input 101 of the Logic Gate 3 is connected to a line 102 which extends between and connects to the conductors 86 and 78. A capacitor C6 and a resistor R7 are connected in series in line 102, and form the Initial State Circuitry 70 that functions to place the multivibrator 66 in its initially stable state. The output of the Logic Gate 3 is delivered through resistor R10, diode D2 to the gating electrode 92 of SCR3. The ouput of the Logic Gate 3 is also applied to input 107 of Logic Gate 2 and to both of the inputs of a Logic Gate 4, which along with the capacitor C4 functions as the Reset 74. Gate 4 is a NOR gate the output of which is applied through capacitor C4 to the cathode of SCR1.

The Tamper Switch Trigger circuitry 68 comprises the conductor 58 and the switches 57a-57d connected in series with a resistor R8 between the conductors 86 and 78. The gating electrode of a SCR2 is connected to the conductor 58 between the switches 57a-57d. The SCR2 has its anode connected to the conductor 86 and its cathode connected through resistor R11 to the conductor 78. The cathode of SCR2 is also connected to the gating electrode 92 of SCR3 by the resistor R9 and the diode 81.

In operation, assume that the shaft 46 has been inserted in the opening 52, thus depressing and closing the push switch 84. The cable 32 has its metallic core 36 connected to the inputs of the Logic Gate 1 by the conductor 39. Upon closing of the switch 84, it is necessary to assure that the monostable multivibrator network 66 is placed in the proper stable state. This is accomplished through the resistor-capacitor timing network R7 and C6 of the Initial State Circuitry 70. When the switch 84 is closed, the potential at input 101 of Logic Gate 3 is initially established at a high state through the resistor R7 until the capacitor C6 is charged. The potential at input 101 then goes low. This momentary high input assures that the output of the Logic Gate 3 will remain low, thus preventing activation of the horn 80 while the pin 100 of the Logic Gate 3 is being placed in a high state. The input 100 is placed in the high state through the resistors R5 and R6. Therefore, although the input 101 returns to a low state, the output of the Logic Gate 3 remains low because of the continued high potential at input 100.

When the switch 84 is closed a high voltage is also applied to the inputs 94 and 96 of Logic Gate 1 through the resistor R1, thus resulting in a low output being produced by Logic Gate 1. Since a low output is applied through resistor R2 to the gating electrode of SCR1, anode-cathode conduction through SCR1 is precluded. When a suitable static sink is applied to the cable 32, such as when wire cutters break the insulation 34 and contact is made with the metal 36, potential is drawn away from the inputs 94 and 96 causing a low input signal to be applied to the Logic Gate 1 which thereby develops a high output. This high output is fed through the current limiting resistor R2 and is applied to the gate of SCR1 thus causing anode-cathode conduction in SCR1. The current flowing through SCR1 is limited by resistor R3 to assure latching of SCR1. The potential created across resistor R3 is transmitted through the current limiting resistor R4 and to the input 105 Logic Gate 2 of the monostable multivibrator 66. The high input signal at input 105 causes Logic Gate 2 to develop a low output signal causing the capacitor C5 to charge through R5. The charging capacitor C5 draws potential away from the input 100 of the Logic Gate 3 causing the input to transform to the logic low level. Because the inputs 100 and 101 of Logic Gate 3 are now both low, Logic Gate 3 develops a high output signal which is applied to the gate 92 of SCR3 through resistor R10 and diode D2. This high signal that is applied to the gate 92 causes anode-cathode conduction in SCR3 causing the horn to sound. The output of Logic Gate 3 remains high for a preset length of time, the time it takes the capacitor C5 to charge. When capacitor C5 is charged, a high signal will again be applied to input 100 of Logic Gate 3 which will thereby develop a low signal. Because the horn operates on an intermittent basis, there is no constant anode-cathode conduction through SCR3. In other words, the horn 80 prevents the SCR3 from latching. Thus, upon completion of the next cycle the horn 80 will deactivate.

When the output of Logic Gate 3 is transformed to the high state, that signal will also be applied to input 107 to Logic Gate 2 and to both of the inputs of the Logic Gate 4 of the Reset Circuit 74. The application of the high input signal to Logic Gate 4 causes its output to transform to the low state. This low pulse is transmitted to capacitor C4 and the negative potential produced thereby is applied to the cathode of SCR1 causing a break in the anode-cathode conduction of SCR1, thus shutting off SCR1. Thus, the Static Sink Detection circuit 72 is placed in a condition ready to develop a signal in response to detection of another electrically conductive contact with the cable 32.

The Tamper Switch Trigger circuit 68 includes the resistor R8 and the serially connected switches 57a–57d which functionally represent the screw member 24 and mounting 54 arrangements. When all the screw members 24 are in place the switches 57a–57d are closed, allowing conduction from the battery 76 through resistor R8 and back to the negative terminal of the battery 76 through conductor 78. This assures no conduction through SCR2 and thus no current flow through the resistor diode series R9 and D1. If any of the screw members 24 are unscrewed a distance sufficient to break contact with the metallic element 56a causing line 58 to open, current will flow through resistor R8 to the gate of the SCR2 causing anode-cathode conduction and thus a current flow through the limiting resistor R11. The potential created across resistor R11 is fed through the current limiting resistor R9 and the buffer diode D1 to the gate 92 of SCR3, causing anode-cathode conduction in SCR3, thereby causing the horn 80 to be activated. Due to the latching of SCR2, SCR3 and the horn 80 will remain on regardless of further operation of the tamper switches 57a–57d or the circuitry 62. The on-off switch 84 must be opened to break conduction in the SCR3 to thereby deactivate the horn.

From the above description, it can be seen that an improved alarm system is provided capable of developing a warning signal for a preset length of time, a time sufficient to ward off a burglar, and then reset the system by terminating the warning signal and resetting the system to detect subsequent conductive contacts with the cable. This invention also provides a unique arrangement for detecting a tampering with the screw members 24 which secure the housing assembly together. This alarm system is simple and effective and provides for a long service life of its components and the batteries which power the system.

What is claimed is:

1. Alarm apparatus comprising a housing, said housing including means forming an access opening to the interior thereof, and further including a closure for said access opening, fastener means for securing said closure to said housing, said fastener means comprising at least one electrically conductive securing member, and a corresponding mounting member which is connected to said housing and to which said securing member is affixed in said secured position of said closure, said mounting member being formed of dielectric material and having a pair of spaced apart electrically conductive elements disposed therein that are electrically connected only when said securing member is in engagement with both of said elements, a power source, a connector element having a pair of ends and being formed at least partially of an electrically conductive material extending substantially over the entire length thereof, insulating means substantially surrounding said electrically conductive material, means for securing said ends of said connector element to said housing, warning signal means operable when electrically connected to said power source to emit a warning signal, control circuitry connected to said electrically conductive material and operable to provide for the operation of said warning signal means for a preset length of time in response to an electrically conductive contact with said conductive material, said control circuitry comprising detecting means having input means connected to said conductive material, resettable triggering means connected to said detecting means, actuating means connected to said triggering means, said actuating means including timer means and being operable when activated to connect said warning signal means to said power source for said preset length of time, means for supplying a voltage to said input means, said detecting means providing a signal to said triggering means to initiate said actuating means to connect said warning signal means to said power source for said preset length of time in reponse to a preselected voltage variance from said voltage at said input means, said connector element and said control circuitry being connected so that said voltage is varied at said input means in response to an electrically conductive contact with said electrically conductive material thereby effecting a conductive path to said input means, and tamper circuitry operable to connect said warning signal means to said power source, said securing member and said elements forming an electrical path in said tamper circuitry in the secured position of said closure to said housing, said electrical path being interrupted in response to disengagement of said securing member with one of said elements thereby providing for the connection of said power source to said warning signal means to generate said warning signal.

2. Alarm apparatus according to claim 1, wherein said voltage supplied at said input means is not lower than a predetermined value, said detecting means providing said signal to said triggering means in response to a lowering of said voltage below said predetermined value as a result of said conductive path extending between said input means and a location at a voltage potential lower than said voltage at said input means.

3. Alarm apparatus according to claim 2, wherein said triggering means has first and second states, said triggering means being placed in said second state to initiate operation of said actuating means in response to an electrically conductive contact with said electrically conductive material.

4. Alarm apparatus according to claim 3, further including resetting means responsive to said actuating means at the termination of said preset length of time to place said triggering means in said first state.

5. Alarm apparatus according to claim 4 further including manually operable switch means for connecting said power source to said control circuitry, and stabilizing means connected to said actuating means to preclude activation thereof for a predetermined time period subsequent to activation of said switch means.

6. Alarm apparatus according to claim 5, wherein said actuating means comprises a monostable multivibrator, and wherein said triggering means comprises a semiconductor controlled rectifier.

* * * * *